(12) United States Patent
Lee et al.

(10) Patent No.: US 11,967,088 B2
(45) Date of Patent: *Apr. 23, 2024

(54) METHOD AND APPARATUS FOR TRACKING TARGET

(71) Applicant: Samsung Electronics Co., Ltd., Suwon-si (KR)

(72) Inventors: HyunJeong Lee, Seoul (KR); Changbeom Park, Seoul (KR); Hana Lee, Suwon-si (KR); Sung Kwang Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/073,737

(22) Filed: Dec. 2, 2022

(65) Prior Publication Data

US 2023/0115606 A1 Apr. 13, 2023

Related U.S. Application Data

(63) Continuation of application No. 17/126,513, filed on Dec. 18, 2020, now Pat. No. 11,544,855.

(30) Foreign Application Priority Data

Mar. 18, 2020 (KR) .................. 10-2020-0033213

(51) Int. Cl.
*G06T 7/246* (2017.01)
*G06F 18/213* (2023.01)
(Continued)

(52) U.S. Cl.
CPC ............ *G06T 7/246* (2017.01); *G06F 18/213* (2023.01); *G06F 18/22* (2023.01); *G06T 7/73* (2017.01);
(Continued)

(58) Field of Classification Search
CPC ........... G06T 7/73; G06T 7/246; G06V 10/40; G06K 9/6215; G06K 9/6232
See application file for complete search history.

(56) References Cited

U.S. PATENT DOCUMENTS 6,233,008 B1 5/2001 Chun
6,449,019 B1 9/2002 Fincher et al.
(Continued)

FOREIGN PATENT DOCUMENTS

CN 110210551 B * 7/2021 ............... G06K 9/48
JP 4578864 B2 11/2010
(Continued)

*Primary Examiner* — Shefali D Goradia
(74) *Attorney, Agent, or Firm* — NSIP Law

(57) ABSTRACT

A target tracking method and apparatus is provided. The target tracking apparatus includes a memory configured to store a neural network, and a processor configured to extract feature information of each of a target included in a target region in a first input image, a background included in the target region, and a searching region in a second input image, using the neural network, obtain similarity information of the target and the searching region and similarity information of the background and the searching region based on the extracted feature information, obtain a score matrix including activated feature values based on the obtained similarity information, and estimate a position of the target in the searching region from the score matrix.

16 Claims, 6 Drawing Sheets

(51) Int. Cl.
*G06F 18/22* (2023.01)
*G06T 7/73* (2017.01)
*G06V 10/40* (2022.01)
*G06V 10/44* (2022.01)
*G06V 10/74* (2022.01)
*G06V 20/00* (2022.01)

(52) U.S. Cl.
CPC ............ *G06V 10/40* (2022.01); *G06V 10/451* (2022.01); *G06V 10/761* (2022.01); *G06V 20/00* (2022.01)

(56) References Cited

U.S. PATENT DOCUMENTS

| | | |
|---|---|---|
| 6,870,945 B2 | 3/2005 | Schoepflin et al. |
| 10,037,610 B1 | 7/2018 | Kim et al. |
| 10,275,709 B2 | 4/2019 | Munteanu et al. |
| 10,528,818 B1 | 1/2020 | Rao et al. |
| 2015/0228085 A1 | 8/2015 | Komiya et al. |
| 2015/0294158 A1 | 10/2015 | Collins et al. |
| 2018/0330172 A1 | 11/2018 | Lee |
| 2019/0057270 A1 | 2/2019 | Heo et al. |
| 2021/0019627 A1 | 1/2021 | Zhang et al. |
| 2021/0295534 A1 | 9/2021 | Cho et al. |

FOREIGN PATENT DOCUMENTS

| | | |
|---|---|---|
| JP | 2012-181710 A | 9/2012 |
| JP | 6350331 B2 | 7/2018 |
| JP | 2018-128897 A | 8/2018 |
| KR | 10-1731243 B1 | 4/2017 |
| KR | 10-1912569 B1 | 10/2018 |
| KR | 10-1918159 B1 | 11/2018 |

\* cited by examiner

METHOD AND APPARATUS FOR TRACKING TARGET

CROSS-REFERENCE TO RELATED APPLICATIONS

This application is a continuation of U.S. application Ser. No. 17/126,513 filed on Dec. 18, 2020, which claims the benefit under 35 USC § 119(a) of Korean Patent Application No. 10-2020-0033213 filed on Mar. 18, 2020, in the Korean Intellectual Property Office, the entire disclosures of which are incorporated herein by reference for all purposes.

BACKGROUND

1. Field

The following description relates to a technology for tracking, in real time or in non-real time, a target within a single time frame of an image.

2. Description of Related Art

Target tracking, which is a different from object detection, refers to a technology for tracking a position of a moving object in a moving image, for example, a video. The object detection refers to a technology for identifying position information of an object in an image along with a category of the object. The object detection may be performed by various methods, for example, frame differencing, optical flow, and background subtraction.

In addition, object classification refers to a technology for determining a category of an object in an image. The object classification may be performed by various methods, for example, shape-based classification, motion-based classification, color-based classification, and texture-based classification.

The target tracking, or object tracking, identifies position information of an object set as a target when successive image inputs are given, and is different from the object classification in that it does not determine a category of the object. The object tracking may track a position of an object by estimating a rough position of the object in a subsequent frame based on a position of the object in a previous frame and determining a similarity. The object tracking may be performed by various methods, for example, point tracking, kernel tracking, and silhouette tracking. A frame used herein refers to an individual image included in a video, and a time frame used herein refers to a time interval in which each of successive images is generated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a target tracking method including extracting feature information of a target included in a target region in a first input image, a background included in the target region, and a searching region in a second input image, using a neural network, obtaining similarity information of the target and the searching region and similarity information of the background and the searching region, based on the extracted feature information, obtaining a score matrix including activated feature values based on the obtained similarity information of the target and the searching region and the obtained similarity information of the background and the searching region, and estimating a position of the target in the searching region from the obtained score matrix.

The extracting of the feature information may include obtaining a first feature map from the target region, obtaining a second feature map from a region obtained by removing the background from the target region, obtaining a third feature map from a region obtained by removing the target from the target region, and obtaining a fourth feature map from the searching region.

The obtaining of the first feature map may include obtaining the first feature map by applying a basic template to the target region, the obtaining of the second feature map may include obtaining the second feature map by applying, to the target region, a positive template with an outside of a closed boundary being masked, and the obtaining of the third feature map may include obtaining the third feature map by applying, to the target region, a negative template with an inside of the closed boundary being masked.

The obtaining of the similarity information may include obtaining a basic similarity matrix by calculating a cross-correlation between the first feature map and the fourth feature map, obtaining a positive similarity matrix by calculating a cross-correlation between the second feature map and the fourth feature map, and obtaining a negative similarity matrix by calculating a cross-correlation between the third feature map and the fourth feature map.

The obtaining of the score matrix may include obtaining the score matrix based on the basic similarity matrix, the positive similarity matrix, and the negative similarity matrix.

The obtaining of the score matrix may include obtaining the score matrix by adding the positive similarity matrix to the basic similarity matrix and subtracting the negative similarity matrix from the basic similarity matrix.

The obtaining of the score matrix may include obtaining the score matrix by applying a weight to each of the positive similarity matrix and the negative similarity matrix.

The estimating of the position of the target may include outputting at least one bounding box by applying an anchor to the score matrix, and estimating the position of the target based on the output bounding box.

The anchor may be configured to discover a form matching a form indicated by a distribution of the activated feature values in the score matrix.

The outputting of the bounding box may include determining a priority of the bounding box corresponding to the anchor based on a degree of matching between the anchor and a distribution of the activated feature values, wherein the estimating of the position of the target may include estimating the position of the target based on the determined priority of the bounding box.

In another general aspect, there is provided a target tracking apparatus including a memory configured to store a neural network, and a processor configured to extract feature information of a target included in a target region in a first input image, a background included in the target region, and a searching region in a second input image, using the neural network, obtain similarity information of the target and the searching region and similarity information of the background and the searching region, based on the extracted feature information, obtain a score matrix including activated feature values based on the obtained similarity information of the target and the searching region and the obtained similarity information of the background and the searching region, and estimate a position of the target in the searching region from the score matrix.

The processor may be configured to obtain a first feature map from the target region, obtain a second feature map from a region obtained by removing the background from the target region, obtain a third feature map from a region obtained by removing the target from the target region, and obtain a fourth feature map from the searching region.

The processor may be configured to obtain the first feature map by applying a basic template to the target region, obtain the second feature map by applying, to the target region, a positive template with an outside of a closed boundary being masked, and obtain the third feature map by applying, to the target region, a negative template with an inside of the closed boundary being masked.

The processor may be configured to obtain a basic similarity matrix by calculating a cross-correlation between the first feature map and the fourth feature map, obtain a positive similarity matrix by calculating a cross-correlation between the second feature map and the fourth feature map, and obtain a negative similarity matrix by calculating a cross-correlation between the third feature map and the fourth feature map.

The processor may be configured to obtain the score matrix based on the basic similarity matrix, the positive similarity matrix, and the negative similarity matrix.

The processor may be configured to obtain the score matrix by adding the positive similarity matrix to the basic similarity matrix and subtracting the negative similarity matrix from the basic similarity matrix.

The processor may be configured to obtain the score matrix by applying a weight to each of the positive similarity matrix and the negative similarity matrix.

The processor may be configured to output at least one bounding box by applying an anchor to the score matrix, and estimate the position of the target based on the output bounding box.

The processor may be configured to determine a priority of the bounding box corresponding to the anchor based on a degree of matching between the anchor and a distribution of the activated feature values, and estimate the position of the target based on the determined priority of the bounding box.

Other features and aspects will be apparent from the following detailed description, the drawings, and the claims.

Figure 1:
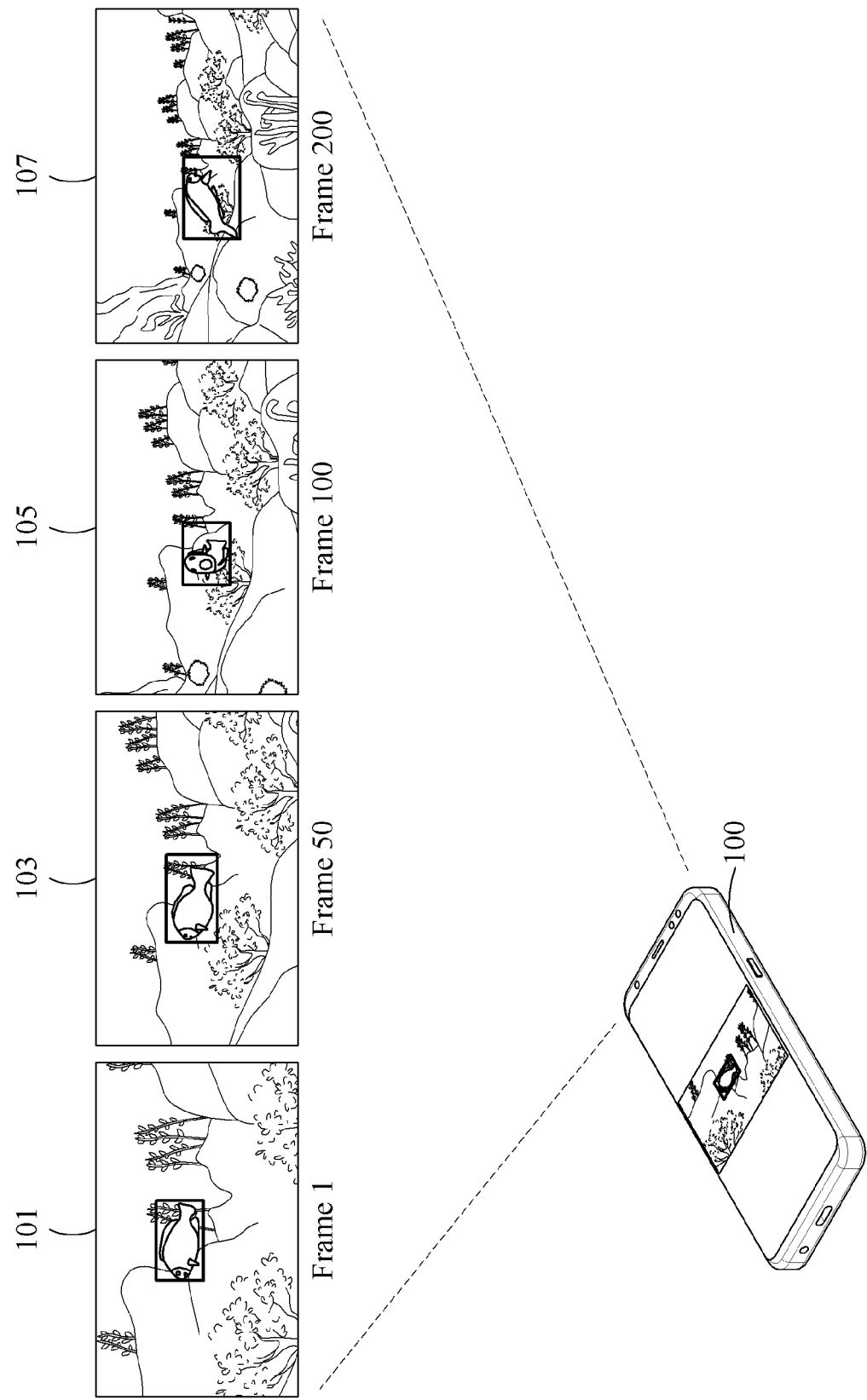
FIG. 1 is a diagram illustrating an example of tracking a target in an input image by a target tracking apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a diagram illustrating an example of tracking a target in an input image by a target tracking apparatus.

A target tracking apparatus 100 may track a target in a moving image, for example, a video. The target tracking apparatus 100 may improve accuracy in tracking the target by suppressing background information. The target tracking apparatus 100 may improve the accuracy in tracking the target by separating the target and the background information in a target region. The background information may also be referred to as context information.

A target may also be referred to herein as an object. A searching region may also be referred to herein as a region of interest (ROI). A second input image may be an image on which target tracking is to be performed and also be referred to herein as a searching image. A first input image may be a reference image used for the target tracking. A target region may refer to a region including the target in the first input image. The target region may include a foreground and a background. The foreground may indicate a region in the target region that is occupied by the target, and the background may indicate a remaining region in the target region that is not the target.

The target tracking apparatus 100 may be an apparatus configured to detect and track a position of an object in a video, and applied to all application fields that track an object, for example, a smartphone, a black box for a vehicle, and a surveillance camera that include an image sensor. The image sensor may include a smart sensor, for example. The smart sensor may be a sensor that embodies an existing image sensor, memory, and processor as a single semiconductor.

The target region may include the background in addition to the foreground. When the target has a relatively low objectness or the background has a relatively high objectness, a similarity to the searching region may be relatively high, and thus target missing may occur. Thus, when a strong feature is present around a target, the strong feature may be confused with the target.

To solve such an issue, the target tracking apparatus 100 may stress the foreground in the target region and suppress the background in the target region. The target tracking apparatus 100 may track a target using a backbone network that is trained based on deep learning. The backbone network may be a network that is trained for object classification. The backbone network may calculate a similarity between feature information associated with objectness and feature information associated with the target.

The target tracking apparatus 100 may obtain a similarity of the target and a similarity of the background by matching the target region and the searching region, and estimate a position of the target using the obtained similarities. The similarity of the background may include information associated with a region around the target. The target tracking apparatus 100 may assign a negative or low value to features in the searching region having a high similarity with the background to suppress an influence of the background, and assign a positive or high value to features in the searching region having a high similarity with the target to stress features associated with the target. To this end, the target tracking apparatus 100 may apply a template including various types of masking information.

The target tracking apparatus 100 may apply a template to a target image to separate the target and the background information in the target region. The template may include masking information. The template may include a basic template, a positive template, and a negative template, for example. The basic template may be a template without a region to be masked. The positive template may be a template that masks the background. The negative template may be a template that masks the target. A result of applying the basic template may include all information of the searching region. A result of applying the positive template may include information associated only with the target. A result of applying the negative template may include information associated only with the background. However, the foregoing templates are provided only as examples, and types of the template are not limited thereto.

Referring to FIG. 1, the target tracking apparatus 100 may extract feature information of an image or a region, calculate a similarity between features, and estimate a position of a target using the calculated similarity.

In the example of FIG. 1, the target tracking apparatus 100 receives a first input image 101 as a first frame. The first input image 101 may be a reference image including a target to be tracked. The target tracking apparatus 100 receives second input images 103, 105, and 107 on which target tracking is to be performed. For example, the first input image 101 may be frame 1 among successive images, for example, frame 1, frame 50, frame 100, and frame 200. In this example, the target tracking apparatus 100 may identify a target included in frame 1 and then track the target in the successive frames 50, 100, and 200.

An image sensor of the target tracking apparatus 100 may obtain the second input images 103, 105, and 107. The image sensor may receive input light and store optical information. The optical information may be analog information and converted to digital information. The digital information may be temporarily stored as the second input images 103, 105, and 107 in a memory. Such a process may be referred to as a read-out process. Subsequently, the target tracking may be performed on the second input images 103, 105, and 107.

The target tracking apparatus 100 obtains feature information of the first input image 101 and feature information of ROIs in the second input images 103, 105, and 107, using a trained neural network. The feature information may include a feature map or a feature matrix. The target tracking apparatus 100 may extract the feature information through a backbone network trained for deep learning-based object classification. The backbone network may be a network to which a weight of a neural network trained for object classification is applied. The neural network may identify objectness in an input image and represent, in a form of a feature map, activated feature values indicating the objectness. For example, the feature information may be represented as a matrix including 128 channels.

The neural network may be a siamese network, for example. The siamese network may refer to a neural network that processes two different input vectors simultaneously using a same weight and calculates a similar output vector.

The neural network may include a first neural network and a second neural network. The first neural network and the second neural network may be connected sequentially. The second neural network may include two branches—a classification branch and a regression branch. The classification branch may output a result of determining whether a target is present in an input image or a present object is the target. The regression branch may output a region or a bounding box in which a target is present in an input image.

The target tracking apparatus 100 may calculate a similarity between feature information of a first input image and feature information of a searching region, and obtain a region or a position in ROIs that has a highest similarity. The target tracking apparatus 100 may calculate a cross-correlation while shifting a target in a second input image through a sliding window. Through this, the target tracking apparatus 100 may calculate a cross-correlation among the target, a background, and the searching region, and generate a similarity matrix.

The target tracking apparatus 100 may calculate a similarity between a feature map of the first input image and a feature map of the second input image by calculating a cross-correlation between the feature map of the first input image and the feature map of the second input image. The target tracking apparatus 100 may estimate, as a bounding box, a distribution of feature values in the second input image having a highest similarity to the first input image. The target tracking apparatus 100 may estimate the bounding box or position as a region or position of the target.

The target tracking apparatus 100 may separate a target and a background that are included in a target region by applying a template. The target tracking apparatus 100 may obtain a result in which an influence of the background is suppressed or reduced by using a similarity between the target and a searching region and a similarity between the background and the searching region. The target tracking apparatus 100 may positively apply the similarity between the target and the searching region and negatively apply the similarity between the background and the searching region, thereby obtaining the result in which the influence of the background is suppressed or reduced. Thus, it is possible to distinguish a background more readily and maintain a high level of accuracy even when a target is deformed or rotated.

A result of target tracking performed by the target tracking apparatus 100 may be evaluated using various evaluation metrics. For example, OP, AUC, and DP may be used for the evaluation. DP, which is an abbreviation for distance precision, refers to a ratio of the number of frames in which a difference between a center point of a correct bounding box indicating an accurate position of an object and a center point of a bounding box estimated by a model is less than 20 pixels. OP, which is an abbreviation for overlap precision, refers to a ratio of the number of frames in which an overlapping region between the correct bounding box and the estimated bounding box is greater than or equal to 50%. A result of target tracking performed by the target tracking apparatus 100 may show that the accuracy is improved by 0.6% compared to a result of target tracking performed using an existing method.

Figure 2:
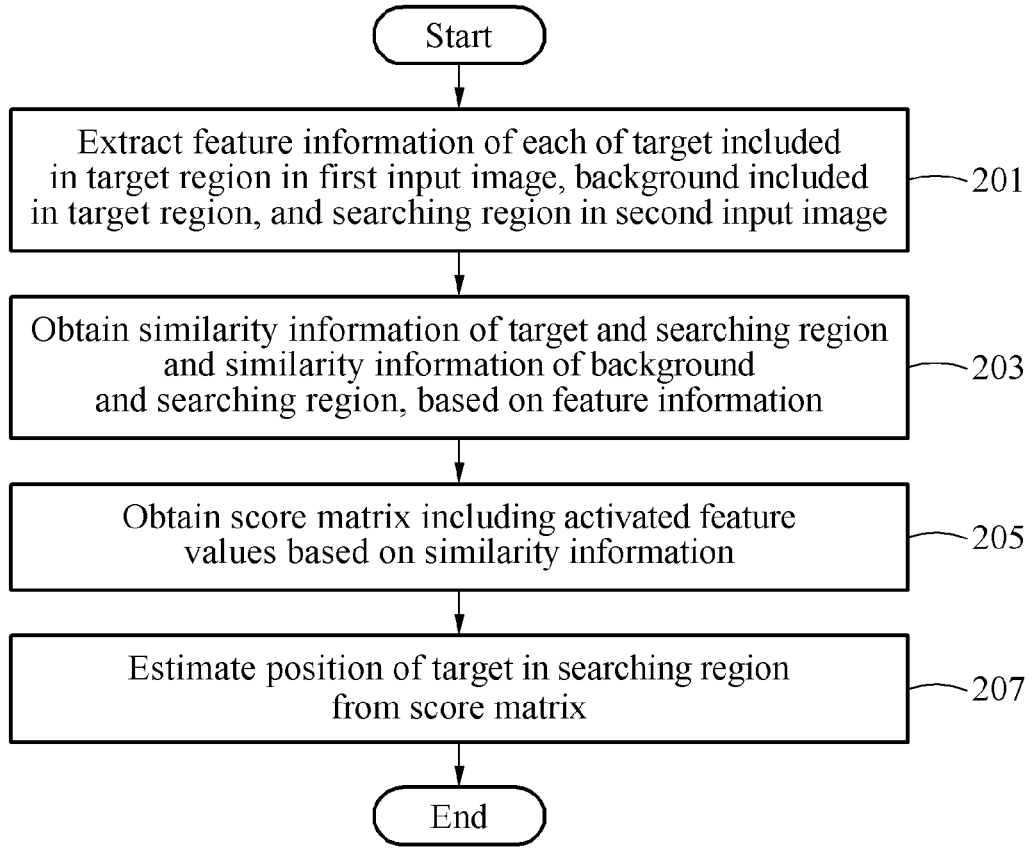
FIG. 2 is a diagram illustrating an example of a target tracking method.

FIG. 2 is a diagram illustrating an example of a target tracking method. The target tracking method to be described hereinafter with reference to FIG. 2 may be performed by the target tracking apparatus 100 described above with reference to FIG. 1. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 201, the target tracking apparatus 100 extracts feature information of each of a target included in a target region in a first input image, a background included in the target region, and a searching region in a second input image, using a neural network. The target tracking apparatus 100 may obtain a first feature map from the target region. The target tracking apparatus 100 may obtain the first feature map by applying a basic template to the target region. The target tracking apparatus 100 may obtain a second feature map from a region obtained by removing the background from the target region. The target tracking apparatus 100 may obtain the second feature map by applying, to the target region, a positive template with an outside of a closed boundary being masked. The closed boundary may indicate a line used to distinguish a region to which masking is to be applied. The target tracking apparatus 100 may obtain a third feature map from a region obtained by removing the target from the target region. The target tracking apparatus 100 may obtain the third feature map by applying, to the target region, a negative template with an inside of the closed boundary being masked. The target tracking apparatus 100 may obtain a fourth feature map from the searching region.

In operation 203, the target tracking apparatus 100 obtains similarity information associated with a similarity between the target and the searching region and similarity information associated with a similarity between the background and the searching region, based on the feature information. The target tracking apparatus 100 may obtain a basic similarity matrix by calculating a cross-correlation between the first feature map and the fourth feature map. The target tracking apparatus 100 may obtain a positive similarity matrix by calculating a cross-correlation between the second feature map and the fourth feature map. The target tracking apparatus 100 may obtain a negative similarity matrix by calculating a cross-correlation between the third feature map and the fourth feature map.

In operation 205, the target tracking apparatus 100 obtains a score matrix including a plurality of activated feature values based on the similarity information between the target and the searching region and the similarity information between the background and the searching region. The target tracking apparatus 100 may obtain the score matrix based on the basic similarity matrix, the positive similarity matrix, and the negative similarity matrix. The target tracking apparatus 100 may obtain the score matrix by adding the positive similarity matrix to the basic similarity matrix and subtracting the negative similarity matrix from the basic similarity matrix. The target tracking apparatus 100 may obtain the score matrix by applying a weight to each of the positive similarity matrix and the negative similarity matrix.

In operation 207, the target tracking apparatus 100 estimates a position of the target in the searching region from the score matrix. The target tracking apparatus 100 may output at least one bounding box by applying an anchor of at least one form to the score matrix. The anchor may indicate various types of form, and refers to a tool used to discover a form that matches a form indicated by a distribution of the activated feature values in the score matrix. The target tracking apparatus 100 may determine a priority of a bounding box corresponding to each anchor based on a degree of matching between the anchor and the distribution of the activated feature values. The target tracking apparatus 100 may estimate the position of the target based on the bounding box. The target tracking apparatus 100 may estimate the position of the target based on the priority of the bounding box.

Figure 3:
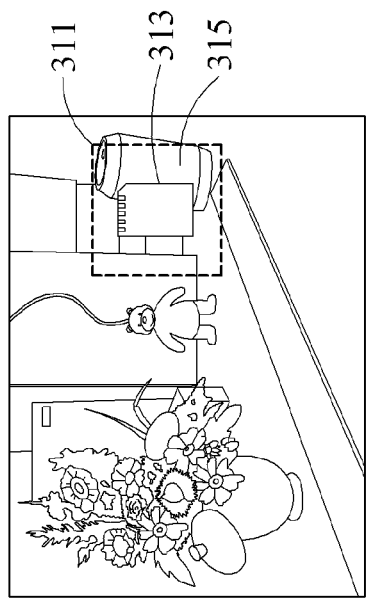
FIG. 3 is a diagram illustrating examples of a type of a template and a region included in an input image.
Figure 3:
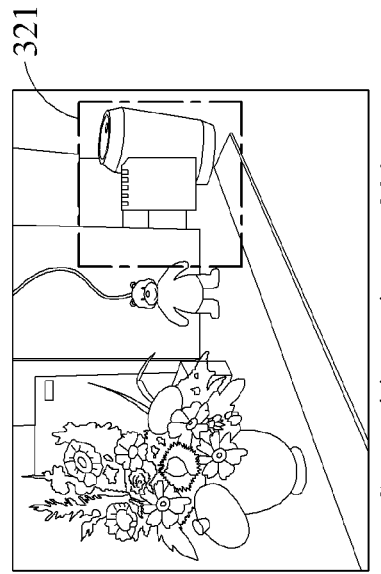
Figure 3:
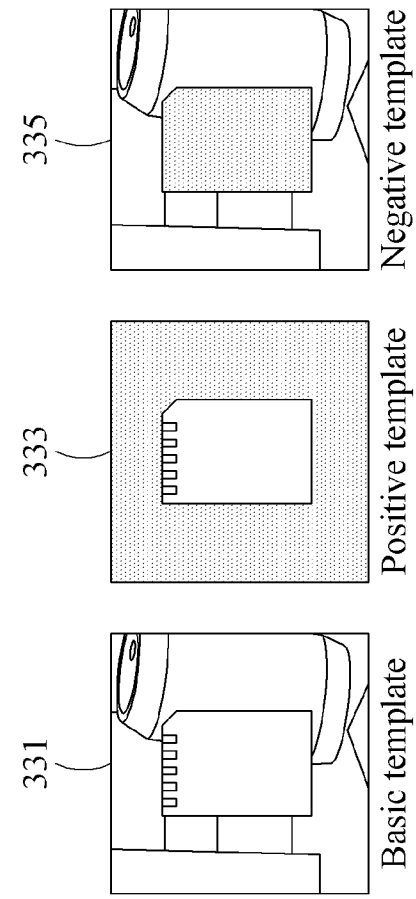

FIG. 3 is a diagram illustrating examples of a type of a template and a region included in an input image.

Referring to FIG. 3, a first input image 310, which is a reference image to be used for target tracking, includes a target region 311, a target 313, and a background 315. The target 313 may be an object to be tracked in the target tracking, and the target region 311 may be a region including the target 313 and the background 315 which is a region around the target 313. The target region 311 includes the region around the target 313 because, when it includes such a region, performance in the target tracking may increase compared to when it does not include such a region. However, when a background influence increases, the performance may be degraded. To solve such an issue, the target tracking apparatus 100 may suppress the background influence and improve accuracy in the target tracking.

A searching region 321 is included in a second input image 320, and may be set based on a position of the target 313 estimated in a previous time frame and set to be broader than the target region 311. For example, the searching region 321 may be set to be a region increased by a factor of N times based on a bounding box indicating information of the position of the target 313 estimated in the previous time frame.

The target tracking apparatus 100 may apply a template to the target region 311 to separate the target 313 and the background 315. The target tracking apparatus 100 may exclude information of the background 315 by applying, to the target region 311, a positive template 333 with an outside of a closed boundary being masked. The target tracking apparatus 100 may exclude information of the target 313 by applying, to the target region 311, a negative template 335 with an inside of the closed boundary being masked. The target tracking apparatus 100 may maintain information of an entirety of the target region 311 by applying a basic template 331 to the target region 311.

Figure 4:
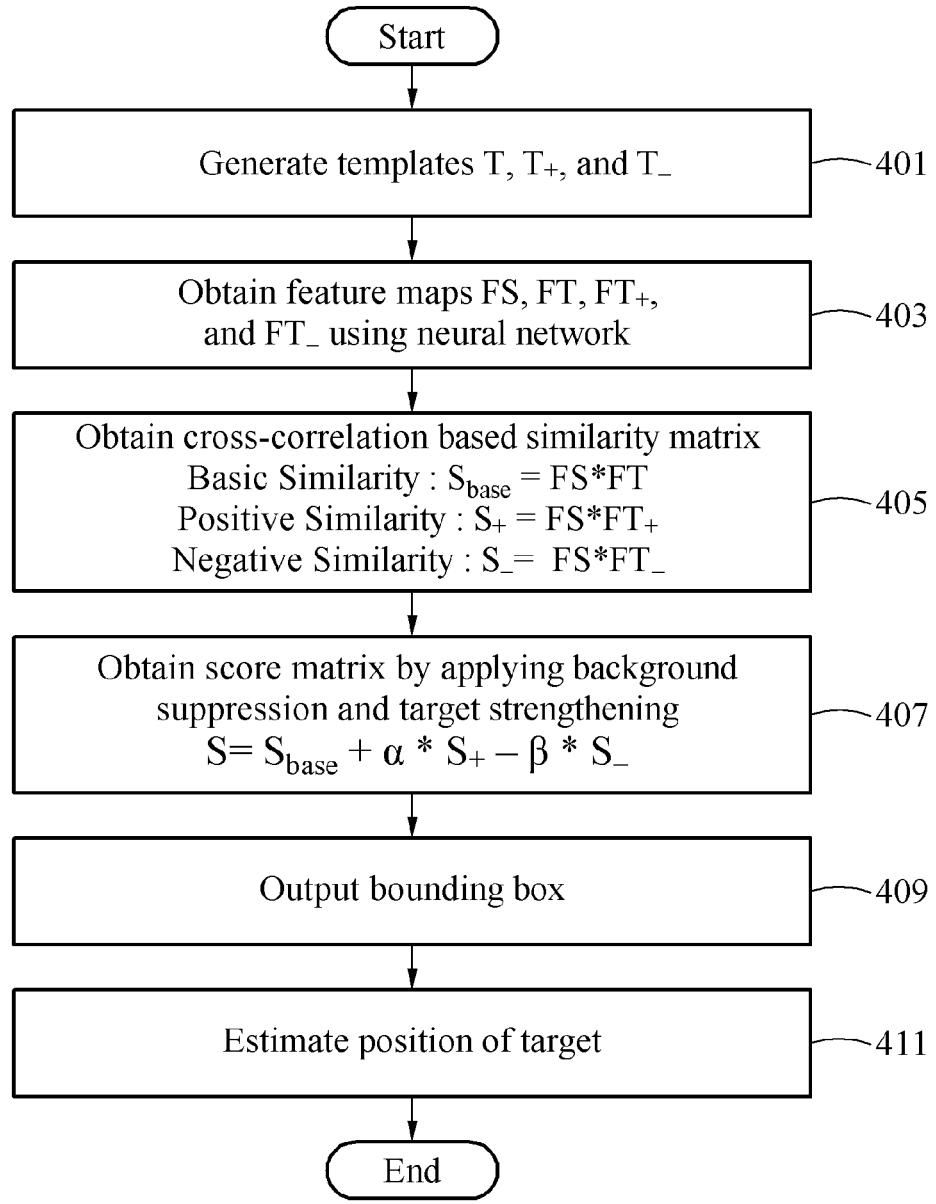
FIG. 4 is a diagram illustrating an example of a target tracking method.

FIG. 4 is a diagram illustrating an example of a target tracking method. The target tracking method to be described hereinafter with reference to FIG. 4 may be performed by the target tracking apparatus 100 described above with reference to FIG. 1. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 401, the target tracking apparatus 100 generates templates T, T+, and T−. T indicates a basic template, T+ indicates a positive template, and T− indicates a negative template.

In operation 403, the target tracking apparatus 100 obtains feature maps FS, FT, FT+, and FT−, using a neural network. FT indicates a first feature map obtained by applying the basic template to a target region, FT+ indicates a second feature map obtained by applying the positive template to the target region, FT− indicates a third feature map obtained by applying the negative template to the target region, and FS indicates a fourth feature map obtained by inputting a searching region to the neural network.

In operation 405, the target tracking apparatus 100 obtains a cross-correlation based similarity matrix. A basic similarity is indicated as $S_{base}$ and calculated to be FS*FT. A positive similarity is indicated as S+ and calculated to be FS*FT+. A negative similarity is indicated as S− and calculated to be FS*FT−. * denotes a cross-correlation operation.

In operation 407, the target tracking apparatus 100 obtains a score matrix by applying background suppression and target strengthening. For example, the score matrix may be calculated as represented, $S=S_{base}+\alpha*S+-\beta*S-$, in which $\alpha$ and $\beta$ are positive numbers.

In operation 409, the target tracking apparatus 100 outputs a bounding box.

In operation 411, the target tracking apparatus 100 estimates a position of a target.

Figure 5:
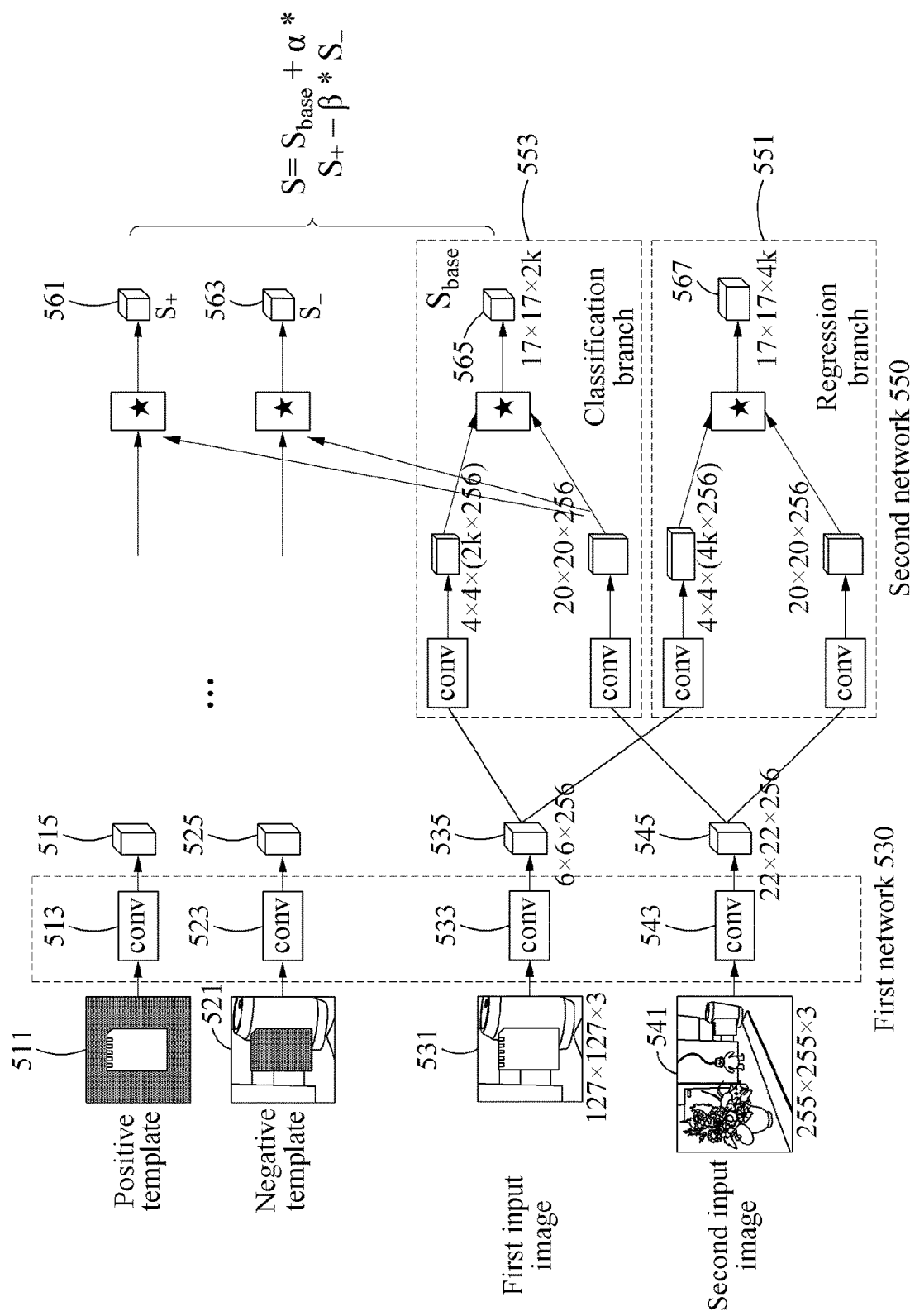
FIG. 5 is a diagram illustrating an example of calculating a similarity of a feature map by a target tracking apparatus.

FIG. 5 is a diagram illustrating an example of calculating a similarity of a feature map by a target tracking apparatus.

Referring to FIG. 5, a neural network used for a target tracking apparatus, for example, the target tracking apparatus 100, includes a first network 530 and a second network 550. A last layer of the first network 530 may be connected to a first layer of the second network 550. The first network 530 includes convolutional layers 513, 523, 533, and 543. The convolutional layers 513, 523, 533, and 543 may be different and separate layers, or same layers. The first network 530 may output a feature map of an input image.

The second network 550 includes two branches. The second network 550 includes a classification branch 553 and a regression branch 551. The classification branch 533 may output a result indicating whether a target is present in an input image, or a present object is the target. The regression branch 551 may output a region in the input image in which the target is present.

A target region 531 may be set in a first input image. The target tracking apparatus 100 may apply a template to the target region 531. The target tracking apparatus 100 may obtain a result 511 by applying a positive template to the target region 531. The target tracking apparatus 100 may obtain a result 521 by applying a negative template to the target region 531. The target tracking apparatus 100 may obtain a second feature map 515 and a third feature map 525 by inputting the results 511 and 521 to the pre-trained neural networks 513 and 523, respectively. A feature map may be obtained by inputting, to a neural network, a result obtained by applying a template.

The target tracking apparatus 100 may obtain a first feature map 535 by inputting, to the neural network 533, the target region 531 to which a basic template is applied. The target tracking apparatus 100 may obtain a fourth feature map 545 by inputting, to the neural network 543, the second input image 541 or a searching region in the second input image 541.

The target tracking apparatus 100 may calculate a similarity between feature maps using the classification branch 553 of the second network 550. The target tracking apparatus 100 may obtain a basic similarity matrix $S_{base}$ 565 through a cross-correlation operation between the first feature map 535 and the fourth feature map 545. The target tracking apparatus 100 may obtain a positive similarity matrix S+ 561 through a cross-correlation operation between the second feature map 515 and the fourth feature map 545. The target tracking apparatus 100 may obtain a negative similarity matrix S− 563 through a cross-correlation operation between the third feature map 525 and the fourth feature map 545.

The target tracking apparatus may calculate a score matrix S using the positive similarity matrix S+ 561, the negative similarity matrix S− 563, and the basic similarity matrix $S_{base}$ 553. The target tracking apparatus 100 may positively apply the positive similarity matrix S+ 561 and negatively apply the negative similarity matrix S− 563, thereby obtaining the score matrix S with a suppressed or reduced background influence. The score matrix S may indicate whether a target is present in an input image or a present object is the target.

The target tracking apparatus 100 may obtain a matrix 567 in the regression branch 551. The matrix 567 may be used to indicate a region in an input image in which the target is present. k of the matrix 567 may be set using k having a highest value of the score matrix S, and a bounding box indicating a position of the target may be set in the matrix 567.

Figure 6:
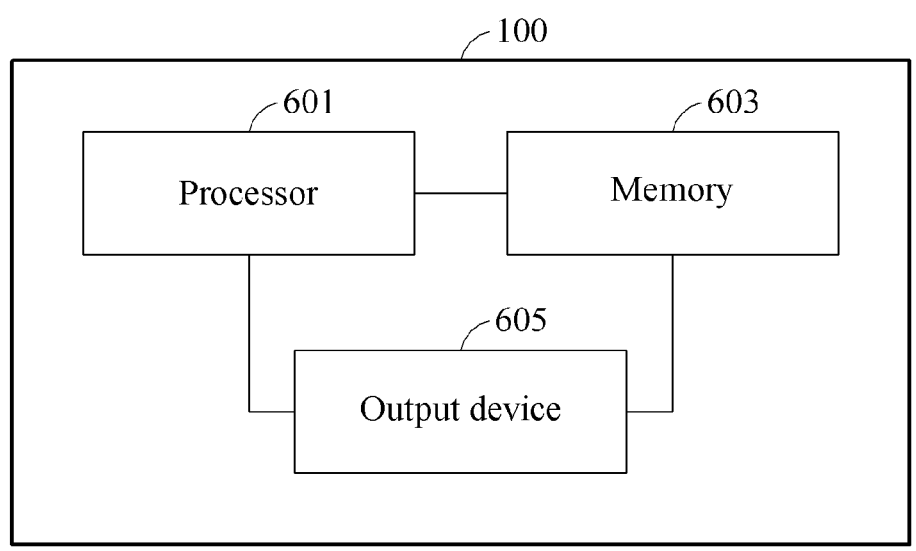
FIG. 6 is a diagram illustrating an example of a target tracking apparatus.

FIG. 6 is a diagram illustrating an example of a target tracking apparatus.

Referring to FIG. 6, the target tracking apparatus 100 includes at least one processor 601, a memory 603, and an output device 605.

The processor 601 may extract feature information of each of a target included in a target region in a first input image, a background included in the target region, and a searching region in a second input image. The processor 601 may obtain a first feature map from the target region. The processor 601 may obtain the first feature map by applying a basic template to the target region. The processor 601 may obtain a second feature map from a region obtained by removing the background from the target region. The processor 601 may obtain the second feature map by applying, to the target region, a positive template with an outside of a closed boundary being masked. The closed boundary used herein may indicate a line used for identifying a region to which masking is to be applied. The processor 601 may obtain a third feature map from a region obtained by removing the target from the target region. The processor 601 may obtain the third feature map by applying, to the target region, a negative template with an inside of the closed boundary being masked. The processor 601 may obtain a fourth feature map from the searching region.

The processor 601 may obtain similarity information of the target and the searching region and similarity information of the background and the searching region, based on the extracted feature information. The processor 601 may obtain a basic similarity matrix by calculating a cross-correlation between the first feature map and the fourth feature map. The processor 601 may obtain a positive similarity matrix by calculating a cross-correlation between the second feature map and the fourth feature map. The processor 601 may obtain a negative similarity matrix by calculating a cross-correlation between the third feature map and the fourth feature map.

The processor 601 may obtain a score matrix including a plurality of activated feature values based on the similarity information of the target and the searching region and the similarity information of the background and the searching region. The processor 601 may obtain the score matrix based on the basic similarity matrix, the positive similarity matrix, and the negative similarity matrix. The processor 601 may obtain the score matrix by adding the positive similarity matrix to the basic similarity matrix and subtracting the negative similarity matrix from the basic similarity matrix. The processor 601 may obtain the score matrix by applying a weight to each of the positive similarity matrix and the negative similarity matrix.

The processor 601 may estimate a position of the target in the searching region from the score matrix. The processor 601 may output at least one bounding box by applying, to the score matrix, an anchor of at least one form. The anchor may have various types of form, and refer to a tool used to discover a form matching a form indicated by a distribution of the activated feature values in the score matrix. The processor 601 may determine a priority of a bounding box corresponding to an anchor based on a degree of matching between the anchor and the distribution of the activated feature values. The processor 601 may estimate the position of the target based on the at least one bounding box. The processor 601 may estimate the position of the target based on the priority of the at least one bounding box. The processor may output the target to the output device 605 or may apply the target to an application through the output device 605.

In an example, the output device 605 is a physical structure that includes one or more hardware components that provide the ability to render a user interface, render a display, and/or receive user input. The output device 605 is not limited to the example described above, and any other displays, such as, for example, computer monitor and eye glass display (EGD) that are operatively connected to the target tracking apparatus 100 may be used without departing from the spirit and scope of the illustrative examples described. In an example, the output device 605 is a physical structure that includes one or more hardware components that provide the ability to render a user interface, render a display, output information, and/or receive user input.

The target tracking apparatus, and other apparatuses, devices, units, modules, and components described herein with respect to FIGS. 1, 5, and 6 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software includes at least one of an applet, a dynamic link library (DLL), middleware, firmware, a device driver, an application program storing the target tracking method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A target tracking method comprising:
obtaining similarity information of a target in a target region in a first image and a searching region in a second image, including extracting feature information of the target in the target region in the first image;
obtaining similarity information of a background in the target region and the searching region in the second image, including extracting feature information of the background in the target region and extracting feature information of the searching region in the second input image;
obtaining a score matrix based on the obtained similarity information of the target and the searching region and the obtained similarity information of the background and the searching region; and
estimating a position of the target in the searching region from the obtained score matrix,
wherein the extracting of the feature information of the target in the target region comprises obtaining a first feature map from the target region,
wherein the extracting of the feature information of the background in the target region comprises:
obtaining a second feature map from a region obtained by removing the background from the target region; and
obtaining a third feature map from a region obtained by removing the target from the target region, and wherein the extracting of the feature information of the searching region in the second input image comprises obtaining a fourth feature map from the searching region.

2. The target tracking method of claim 1,
wherein the obtaining of the first feature map comprises obtaining the first feature map by applying a basic template to the target region,
wherein the obtaining of the second feature map comprises obtaining the second feature map by applying, to the target region, a positive template with an outside of a closed boundary being masked, and
wherein the obtaining of the third feature map comprises obtaining the third feature map by applying, to the target region, a negative template with an inside of the closed boundary being masked.

3. The target tracking method of claim 1,
wherein the obtaining of the similarity information of the target in the target region and the searching region comprises obtaining a basic similarity matrix by calculating a cross-correlation between the first feature map and the fourth feature map, and
wherein the obtaining of the similarity information of the background in the target region and the searching region in the second image comprises:
obtaining a positive similarity matrix by calculating a cross-correlation between the second feature map and the fourth feature map; and
obtaining a negative similarity matrix by calculating a cross-correlation between the third feature map and the fourth feature map.

4. The target tracking method of claim 3, wherein the obtaining of the score matrix comprises:
obtaining the score matrix based on the basic similarity matrix, the positive similarity matrix, and the negative similarity matrix.

5. The target tracking method of claim 4, wherein the obtaining of the score matrix comprises:
obtaining the score matrix by adding the positive similarity matrix to the basic similarity matrix and subtracting the negative similarity matrix from the basic similarity matrix.

6. The target tracking method of claim 5, wherein the obtaining of the score matrix comprises:
obtaining the score matrix by applying a weight to each of the positive similarity matrix and the negative similarity matrix.

7. A target tracking method comprising:
obtaining similarity information of a target in a target region in a first image and a searching region in a second image;
obtaining similarity information of a background in the target region and the searching region in the second image;
obtaining a score matrix based on the obtained similarity information of the target and the searching region and the obtained similarity information of the background and the searching region; and
estimating a position of the target in the searching region from the obtained score matrix,
wherein the estimating of the position of the target comprises:
outputting at least one bounding box by applying an anchor to the score matrix; and
estimating the position of the target based on the output bounding box.

8. The target tracking method of claim 7, wherein the anchor is configured to discover a form matching a form indicated by a distribution of the activated feature values in the score matrix.

9. The target tracking method of claim 7,
wherein the outputting of the bounding box comprises determining a priority of the bounding box corresponding to the anchor based on a degree of matching between the anchor and a distribution of the activated feature values, and
wherein the estimating of the position of the target comprises estimating the position of the target based on the determined priority of the bounding box.

10. A target tracking apparatus comprising:
a memory configured to store a first image and a second image; and
a processor configured to:
obtain similarity information of a target in a target region in a first image and a searching region in a second image, including extracting feature information of the target in the target region in the first image;
obtain similarity information of a background in the target region and the searching region in the second image, including extracting feature information of the background in the target region and extracting feature information of the searching region in the second input image;
obtain a score matrix based on the obtained similarity information of the target and the searching region and the obtained similarity information of the background and the searching region; and
estimate a position of the target in the searching region from the score matrix, wherein the processor is further configured to:
obtain a first feature map from the target region;
obtain a second feature map from a region obtained by removing the background from the target region;
obtain a third feature map from a region obtained by removing the target from the target region; and
obtain a fourth feature map from the searching region.

11. The target tracking apparatus of claim 10, wherein the processor is further configured to:
obtain the first feature map by applying a basic template to the target region;
obtain the second feature map by applying, to the target region, a positive template with an outside of a closed boundary being masked; and
obtain the third feature map by applying, to the target region, a negative template with an inside of the closed boundary being masked.

12. The target tracking apparatus of claim 10, wherein the processor is further configured to:
obtain a basic similarity matrix by calculating a cross-correlation between the first feature map and the fourth feature map;
obtain a positive similarity matrix by calculating a cross-correlation between the second feature map and the fourth feature map; and
obtain a negative similarity matrix by calculating a cross-correlation between the third feature map and the fourth feature map.

13. The target tracking apparatus of claim 12, wherein the processor is further configured to:
obtain the score matrix based on the basic similarity matrix, the positive similarity matrix, and the negative similarity matrix.

14. The target tracking apparatus of claim 13, wherein the processor is further configured to:
    obtain the score matrix by adding the positive similarity matrix to the basic similarity matrix and subtracting the negative similarity matrix from the basic similarity matrix.

15. A vehicle comprising the target tracking apparatus of claim 10.

16. A smartphone comprising the target tracking apparatus of claim 10.

* * * * *